United States Patent [19]

Short

[11] Patent Number: 4,641,078
[45] Date of Patent: Feb. 3, 1987

[54] METHOD FOR CHARGING ELECTRICAL STORAGE BATTERIES

[75] Inventor: Jimmie N. Short, Lexington, Ky.

[73] Assignee: Ralph J. Stolle Company, Cincinnati, Ohio

[21] Appl. No.: 639,090

[22] Filed: Nov. 13, 1984

[51] Int. Cl.[4] ............................................. H02J 7/00
[52] U.S. Cl. ........................................ 320/21; 320/40
[58] Field of Search ............................. 320/21, 39, 40

[56] References Cited

U.S. PATENT DOCUMENTS 4,147,970  4/1979  Okuda et al. ...................... 320/21
4,371,826  2/1983  Shelly ................................ 320/21

Primary Examiner—Patrick R. Salce
Assistant Examiner—Anita M. Ault
Attorney, Agent, or Firm—Edward M. Steutermann

[57] ABSTRACT

Apparatus and method for charging electrical storage batteries including apparatus providing a charging current of selected value and cyclical wave generator for periodically varying on the charging current as a cyclical wave form having a frequency of 2 to 75 kilohertz, the wave form having an amplitude of at least plus and minus 5% of the value of the charging current.

9 Claims, 6 Drawing Figures

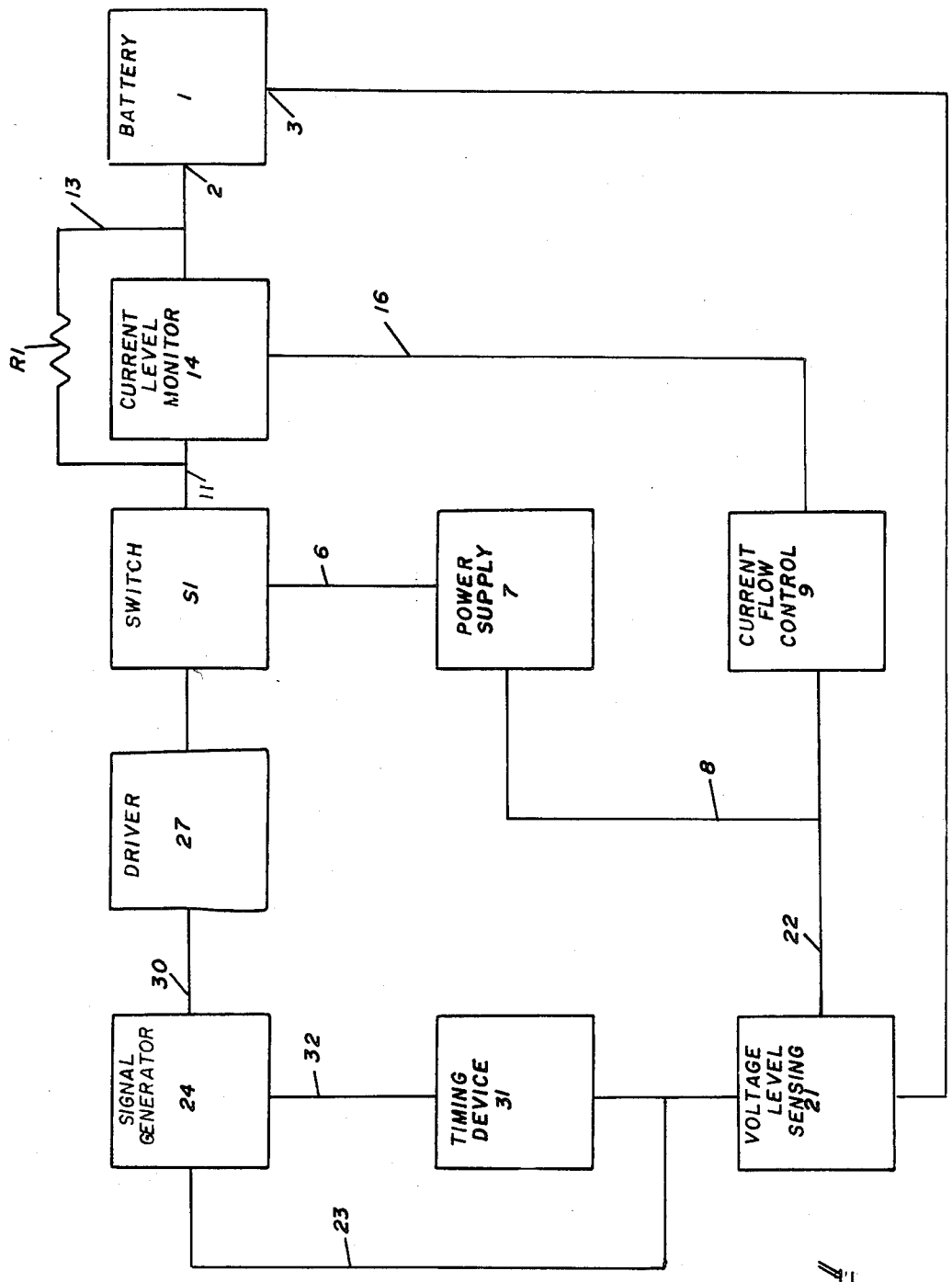

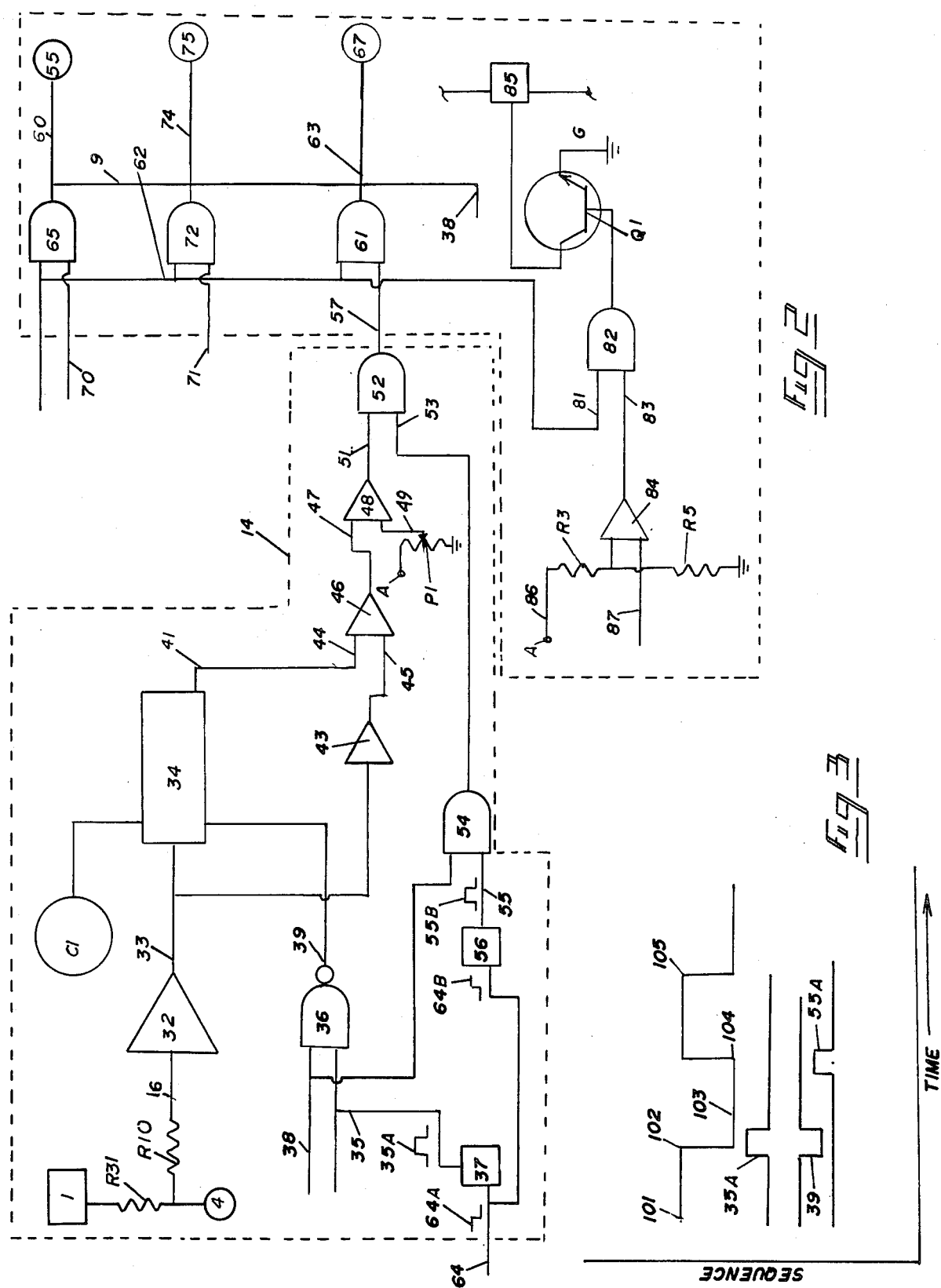

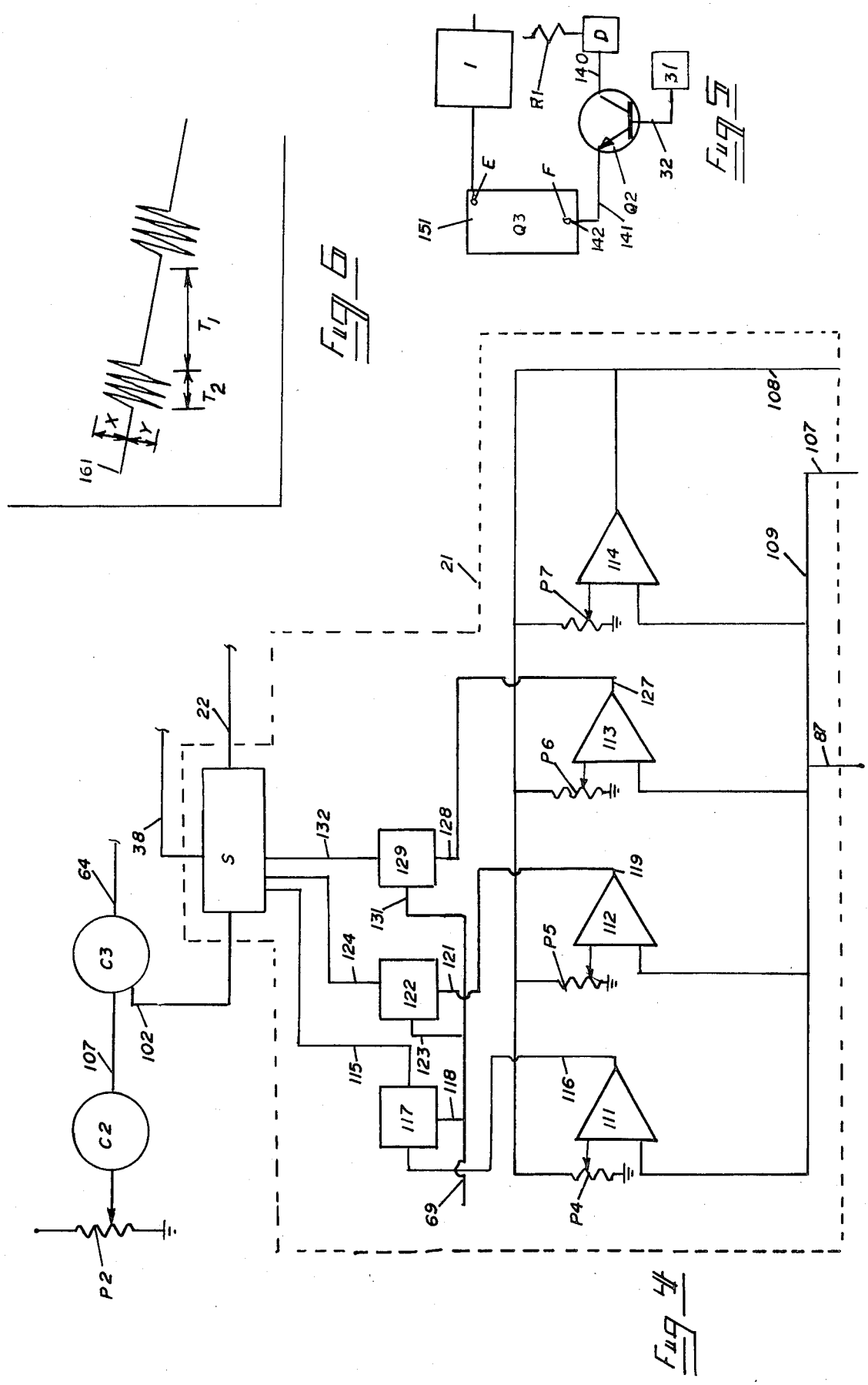

METHOD FOR CHARGING ELECTRICAL STORAGE BATTERIES

BACKGROUND OF THE INVENTION

The present invention relates to devices for supplying characteristic current flow which is particularly useful in supply charging current to electrical storage batteries, for example charging lead-acid storage batteries as known in the art.

Battery chargers of various types are commonly used and, in general, include dynamoelectric devices which generally include rotating machines functioning through electro-magnetic phenomena associated with current carrying conductors passing through a magnetic field to provide a source of electricity for use in charging batteries as well as devices of the alternating current rectifier type. The dynamoelectric devices can be of the direct current type which generate a fixed polarized current which can be supplied directly to a battery or can provide an alternating current which is then rectified, as is known in the art, to provide a direct current fixed polarized source for battery charging.

Alternatively, charging devices are utilized using commercially available alternating current which is rectified and then supplied to the battery as direct current having fixed positive and negative polarity. Heretofore, it has been generally thought desirable to supply a generally stable, rectified, filtered voltage and current source for use in charging electric batteries and particularly for use in charging a lead-acid batteries.

While the present invention is described in terms of charging lead-acid batteries it will be recognized that the methods and apparatus within the scope of the present invention are useful in charging other types of batteries and supplying current for other applications.

No prior art device is known for provided direct current electric charge to batteries to recharge the battery where the current flow is periodically cycled at a selected rate for a selected period of time at selected frequencies in order to improve the efficiency of the battery charging.

SUMMARY OF THE INVENTION

The present invention provides new, useful and economical methods and devices for charging or recharging electrical storage batteries or supplying current for other purposes where a cyclical wave is periodically impressed upon a charging current supply.

It has been unexpectedly found that, in accordance with the present invention, impression of a cyclical signal upon the charging current to an electrical storage battery in the manner described hereinafter, greatly increases the charging efficiency of an electric storage battery, particularly a lead-acid battery and even more particularly greatly reduces the time necessary for the charging cycle over that required by the use of other prior art devices such as dynamoelectric devices and rectifier devices which provide a generally uniform current flow, even at varying current rates.

Moreover, it has also been found that utilization of methods and devices within the scope of the present invention will improve the operating characteristics of the storage battery after it has been charged and even allow the use of batteries which could not be utilized when charged by prior art methods.

Further devices within the scope of the present invention can be utilized in connection with various electrical sources, for example dynamoelectric devices or rectifier type device which use alternating current.

More particularly, the present invention provides apparatus and method for charging electrical storage batteries including apparatus providing a charging current of selected value and cyclical wave generator for periodically impressing on the charging current a cyclical wave form at a frequency of 4 to 75 kilohertz, the wave form having an amplitude of at least plus and minus 10% of the value of the charging current.

While various arrangements within the scope of the present invention will occur to those skilled in the art upon reading the disclosure set forth hereinafter, one example within the scope of the present invention is illustrated within the accompanying drawings but not by way of limitation.

BRIEF DESCRIPTION OF THE DRAWINGS

In one example in accordance with the present invention shown in the accompanying figures:

FIG. 1 is a schematic block diagram of one example of an arrangement within the scope of the present invention;

FIG. 2 is a schematic illustration of a current sampling arrangement used in the example shown in FIG. 1;

FIG. 3 is a graphic illustration of sampling signal generated in the device shown in FIG. 2;

FIG. 4 is an example of a voltage testing and sample timing arrangement useful in devices within the scope of the present invention;

FIG. 5 is a schematic illustration of a circuit to provide charging current in an example of a device within the scope of the present invention; and FIG. 6 is a graphic illustration of the charging current flow in devices within the scope of the present invention.

DETAILED DESCRIPTION OF THE DRAWINGS

One example of the overall procedure of the present invention is illustrated in FIG. 1, which is a schematic illustration of the operation of a device within the scope of the present invention.

In FIG. 1 a battery 1 is provided to be charged having connection 2 and 3.

As shown, a power supply 7 is provided to supply power to battery 1 by means of a controller 9, described hereinafter. In the arrangements shown the negative side of the battery is controlled but in practice either side can be controlled. Power supply can be any convenient source of direct current, for example in motor driven dynamoelectric device or a rectifier to rectify alternating current. A switch S1 which, for example can include solid state switch devices such as transistors, as described hereinafter, can be provided to cycle the current flow, as described hereinafter. Output 11 from switch S1 is supplied to a shunt resistor R1 and to the terminal 2 of battery 1 where most of the current flow is to battery 1. The portion supplied through shunt resistor R1 is utilized to monitor current flow by means of charge current level monitor 14 which monitors, inter alia, the rate of change of the current flow to battery 1. Monitor 14 has an output 16 which supplies a signal to controller 9 which regulates the current flow from power supply 7 where output signal 8 is supplied from controller 9 to a regulated DC power supply 7 which having an output 6 which supplies power to the switch S1, as described hereinafter.

One connection 3 of battery 1 is connected to a voltage level sensing circuit 21, as described hereinafter, which provides an output signal 22 to controller 9 and to power supply 7 which sets up the proper voltage to charge the particular battery 1 being charged, and if needed, to adjust the frequency of the signal from modulator 31 and signal generator 24, as described hereinafter.

Circuit 21 has an output terminal 23 which controls frequency of a cyclical wave generator 24, as described hereinafter, which generates a cyclical, for example triangle, wave form having a frequency determined by the characteristics of the signal generator. Preferably the frequency is at least 4 and preferably less than 75 kilohertz. The cyclical signal is supplied from output 30 of generator 24 to a driver 27, described hereinafter, which operates power switch S1 at the frequency of generator 24 so the cyclical signal is impressed on the current supply from the output 11 of switch S1, as described hereinafter. A second timing device 31, for example a square wave modulator, can be provided to turn the cyclical wave generator on and off at selected intervals, as described hereinafter. In one method of operation the timing device 31 operates at, for example a frequency of approximately 1 kilohertz so the cyclical signal generated by generator 24 is applied to the driver 27 for selected increments of time during which the current supplied to battery 1 is represented by the curve shown in FIG. 6.

A power supply (not shown) can be provided to supply power to the cyclical wave generator 24, the timing regulator 31 and voltage level sensing circuit 21.

FIG. 2 is a schematic illustration of the charge current level monitor 14 and controller shown in FIG. 1.

As shown in FIG. 2, output 16 as shown in FIG. 1 can pass to an input 31 of a current amplifier 32. An amplified current signal is provided at output 33 and supplied to a sample and hold circuit 34. As is known in the art, timing means are required for operation of a sample and hold circuit and in this case the circuit is clocked by a clock C1 to regulate operation of the device.

Sample and hold circuit 34 is provided to periodically sample signal 33, which is indicative of the current flow to battery 1 then after a selected hold period to provide a signal 41 which is generally equal in magnitude to the signal 33 initially sampled so the signal 41 can be compared with the current signal 33 to determined the change in signal 33 during the hold period. The specific configuration of sample and hold circuit 34 is not illustrated in detail but in general can include an amplifier, analog to digital convertor with an analog output connected to a second sample and hold amplifier operating in track mode. In the arrangement shown sample and hold circuit is operated by output 39 of a "NAND" gate 36 which initiates the sample sequence as described hereinafter. Briefly the function of circuit 34 is to periodically sample the current level from amplifier 32, provide, a signal indicative of the charge current level output 41 and hold the signal for a selected period of time, then compare the held sample with a later value.

The sample, sequence is operated in response to timing pulses and in this case in response to operation of a "NAND" gate 36 which has output 39 to the sample and hold circuit 34 where "NAND" gate 36 can have one input operated at selected, but in some cases variable, frequency by a one shot multi vibrator 37 which in the example shown is operated at a rate determined by the charging voltage of the battery 1 which generates the operating pulses 64A on input 64 to one shot multivibrators 37 and 56. A second input 38 of "NAND" gate 36 is actuated when the sampling system is operating.

As described hereinafter, means can be provided to effect changes in the frequency of pulses 64A, an input 64 and the time intervals of the sample and hold circuit 34. One shot multivibrator 37 is operated in response to pulses 64A generated at a frequency responsive to the charging voltage applied to battery 1. Output 35 of one shot multivibrator 37 supplies pulse signals 35A to the other input of "NAND" gate 36 to establish the occurrence of the sample mode on the trailing edge of the pulse 64A.

The sample of the characteristics of signal 33 are taken and held in sample and hold circuit until called for comparison, as described hereinafter. In this regard signal 64 is also supplied to a second one shot 56, which is actuated on the rising edge 64B of the pulse to supply an output pulse 55B at output 55 of one shot 56 to an "AND" gate 54. The other input of gate 54 is supplied from signal 38 so no output can be provided from "AND" gate 54 when the sampling system is not operating. The output signal from gate 54 is then supplied to one input of an "AND" gate 52, as shown.

All of the foregoing is by way of illustration of an example of one feature which can be provided in the present invention. That is the charge cycle can be turned off when the rate change of charge to battery 1 drops below a selected value. As shown in FIG. 2, output 33 from amplifier 32 is continuously supplied to an amplifier 43 which can be provided to supply signal adjustment if necessary at an output 45 supplied to a operational amplifier 46 connected as a differential amplifier. Output 47, from differential amplifier 46 is a voltage signal indicative of the difference between the present rate of charge flow to battery 1 and the rate of charge flow at the time the sample was taken in response to pulse 64A. The output from differential amplifier 46 can be continuously changing in response to time variation of charge current flow but the output 41 is fixed until the next sample pulse 64A. This sequence is illustrated in FIG. 3 where signal 35A and 55A are illustrated. In the figures signal 64A goes "Lo" at point 102 generating the pulse 35A so output 39 of "NAND" gate 36 goes "Lo" and actuates sample and hold circuit 34 to sample signal 33. After a period of time 103, signal 64 rises at point 104 to generate pulse 55A which turns on "AND" gate 54.

The differential signal 47 is supplied to a comparator 48. Input 49 of comparator 48 is supplied with a reference input from a potentiometer P1 which sets the percent change in current during the sampling period between the samples taken by sample and hold circuit 34 which will be required to turn comparator 48 off or to hold the comparator "on". Within the scope of the present potentiometer P1 can be connected to bias signal 41 to provide the effective % change in signal needed to operate the system. Output 51 of comparator 48 goes "Lo" upon the occurrence of selected parameters in charge characteristics occuring between the present charge rate and the rate at the time a sample was taken by the sample and hold circuit 34. That is, in charging a battery the rate of change of charge current diminishes with charge time and at some point the differential in rate of change of charge for an increment of sample time reaches a preselected value determined by reference set by potentiometer P1 so output 51 goes "Hi".

Output 51 of comparator 48 is supplied to the other input of "AND" gate 52 so that a logic signal is supplied at the output 57 of gate 52 if the output 51 of comparator 48 is "Hi" when the output from "AND" gate 54 goes "Hi" then output 57 goes "Hi" to indicate the rate of change of charge has reached the minimum set by potentiometer P1 and turns the system off. Thus completes the sample, hold and comparison cycle.

Output 57 is connected to actuate a switch, through "AND" gate 61, described hereinafter, which provides a system reset signal 63 and can be a multiple switch system actuated by several selected occurrence as described hereinafter.

For example, in this case when a selected, diminished, rate of charge is experienced by differential amplifier 46, comparator 48 is actuated to supply a signal at output 57 of "AND" gate 52, so sampling stops and the system turns off, as described hereinafter.

In FIG. 2 output 57 is supplied to one input of an "AND" gate 61 while the second input is provided by master on signal 62, which is actuated when the system is operating, as described hereinafter.

An input 71 is provided to "AND" gate 72 which is indicative of the charge voltage supplied to battery 1, as described hereinafter with reference to FIG. 4, so that when a selected voltage is reached the signal 71 is actuated to actuate "AND" gate 72 to supply a signal at output 74 to actuate an indicator 75 and line 69 to terminate operation of the system upon the occurrence of specific condition, in this case the achievement of maximum charge voltage.

Additionally a signal 70 is supplied to "AND" gate 65 from clock C2 which, for example, sets the maximum charge time. An output signal 60 is provided by "AND" gate 65 upon expiration of the prescribed time.

It will be seen that within the scope of the present invention various parameters can be utilized to turn off the system and in this case the system can be turned off by:

(a) elapsed maximum charge time (signal 70);
(b) achievement of maximum charge voltage (signal 71);
(c) selectively diminished rate of charge current (signal 57).

The signal 62 is also supplied to an input 81 of an "AND" gate 82 where the second input 83 is supplied from a comparator 84 which receives an input signal 86 through a resistor R3 from power supply A of the charge unit. The second input 87 to comparator 84 is from the positive terminal of battery 1. The system assures that battery 1. is connected and terminates operation if the battery is not connected by means of "AND" gate 82 which gates a transistor Q1 which operates a switch 85 to control the current supply to the battery. It will be understood that within the scope of the present invention other controls can be utilized to operate the system.

Referring now to FIG. 4 which is a schematic illustration of one example of a voltage comparator circuit, a clock 2 is provided with a potentiometer P2 utilized to determine the maximum charge time available through the device when signal 70, as previously described, is supplied so long as the maximum charge time has not lapsed. A clock C3 is provided to be operated so long as clock C2 is within the maximum time to provide the base timing for sampling current rate at input 107, as described hereinafter.

In some applications it is not necessary to provide a maximum charge time, but such an arrangement is shown, in FIG. 4 as an example of accessories available in connection within the scope of the subject application. A switch S is provided having multiple inputs to provide a voltage signal 102 to the clock C3 to modify the sample time internal in accordance with the condition of the battery, as described hereinafter.

The output 38, as previously described, is supplied from switch SW1 to the "NAND" gate 36 to facilitate the sampling. Signal 38 is on so long as the sampling system is on.

As shown in FIG. 4 terminal 107, 108 are provided to indicate the charge voltage. Battery voltage terminal 107 is supplied to an input of comparators 111, 112, 113 and 114, for example the non-inverting input, of each of the comparators 111-114. The system shown in FIG. 4 is utilized to selectively vary the rate of sampling of the current flow rate signal 64 from switch C3 in accordance with change in charging voltage and to provide shut off in the event the charging voltage reaches a selected value.

The second input of comparator 111 is supplied from a potentiometer P4 which is connected to a positive pullup 108, The setting of potentiometer P4 is preset to determine the minimum voltage which will be required to initiate operation of the sampling system. Potentiometers P4-P7 are provided at source V to provide different differential inputs to the comparators 111-114 so the comparators are turned on sequentially as the charge voltage increases during the charging cycle to modify the voltage output 102 from the switch to the clock C3 so that the sample signal supplied from the clock C3 is varied proportionly to the charging voltage. Within the scope of the present invention other means such as voltage controlled oscillators can be used to adjust the sampling frequency in response to charge voltage.

Comparator 114 acts as a maximum voltage cut off when the final voltage is reached it causes a shut off by means of signal 71.

As shown in FIG. 6, one feature of the present invention is the operation of the power supply to provide charge current to battery in a cyclical manner. In this regard, output 25 of voltage level sensing circuit is supplied from controller 21 to actuate square wave modulator 31 and turn on cyclical wave generator 24. A schematic illustration of the triangular wave generator, square wave modulator driver and power switch S1 are illustrated in FIG. 5. Square wave generator 31 FIG. 1 which can, for example be an ICL8038 wave form generator supplies a cyclical wave, for example a square wave signal at output 32 at a selected repetitive frequency. The output 32 from the generator 31 is supplied to a cyclical wave generator 24 where the output 30 from the generator is supplied, to a driver, for example to the base of a transistor Q2 having power supplied to a collector 140 connected to a source of power D and an emitter 141 connected to the base 142 of power transistor Q3 to drive the power transistor in accordance with the signal supplied from the collector of transistor Q2, so current is supplied to battery 1, as shown in FIG. 6.

In accordance with one feature of the present invention it has been found that the performance of the system, particularly in charging a battery, improves so long as the current flow is cycled, by means of the signal applied at base 142, periodically, at a frequency of at least 4 Khertz at an amplitude of ±5% of the charge rate as illustrated in FIG. 6. In FIG. 6 the charge current 161 is shown diminishing with time and periodically the current flow rate is cycled, at the prescribed rate of at least 4 Khertz for a time T2 where there are intervals T1 between the cycling pulses. The time intervals T1 and T2 are determined need to by the setting of modulator 31 which modulates generator 24. In one example modulator 31 has operated at 1 Khertz but the only requirement is that the frequency of modulator be less than the operating frequency of generator 24.

The invention claimed is:

1. Method for charging electrical storage battery means including providing a generally linear charging current of selected value, periodically varying the charging current as a cyclical wave form having a frequency of 2 to 75 kilohertz, the wave form having an amplitude of at least plus and minus 5% of the value of the charging current.

2. The invention of claim 1 wherein said charging current varies with time as said storage battery charges.

3. The invention of claim 2 wherein said charging current diminishes with time as said storage battery is charged.

4. The invention of claim 1 including selectively periodically cycling said charging current at a frequency of 2 to 75 kilohertz for selected periods of time.

5. Apparatus for charging electrical storage battery means including direct current source means to provide said generally linear charging current; current controller means providing a central signal determine the rate of flow of current to said storage battery; switch means connected in series between said direct current source means and said battery means and having signal input means to receive said control signal whereby said switch means is operated by said controller in response to said current flow rate to said battery to regulate rate of current flow to said battery modulator means to receive said control signal and supply an operating signal to cyclical wave generating means to selectively periodically interrupt said cyclical wave generating means.

6. The invention of claim 5 wherein said switch means includes current regulating means whereby rate of current flow through said switch means is regulated in response to said control signal.

7. The invention of claim 6 wherein said switch means includes transistor means.

8. The invention of claim 6 wherein said cyclical wave generating means are provided in series between said controller and said switch means to periodically vary said charging current flow at 2 to 75 kilohertz whereby the charging circuit applied to said battery varies in a cyclical pattern of 2 to 75 kilohertz in a wave form having an amplitude of at least plus and minus 5% of the linear rate of the charging current.

9. The invention of claim 8 wherein said controller means includes voltage measuring means to sense the voltage of said storage battery to supply said control signal to regulate the frequency of operation of said wave generating means.

* * * * *